US012207015B2

(12) United States Patent
Liu et al.

(10) Patent No.: US 12,207,015 B2
(45) Date of Patent: Jan. 21, 2025

(54) METHOD, ELECTRONIC DEVICE, AND COMPUTER PROGRAM PRODUCT FOR VIDEO RECONSTRUCTION

(71) Applicant: Dell Products L.P., Round Rock, TX (US)

(72) Inventors: Zhisong Liu, Shenzhen (CN); Zijia Wang, WeiFang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 200 days.

(21) Appl. No.: 17/892,704

(22) Filed: Aug. 22, 2022

(65) Prior Publication Data

US 2024/0031517 A1  Jan. 25, 2024

(30) Foreign Application Priority Data

Jul. 22, 2022 (CN) .......................... 202210875518.4

(51) Int. Cl.
*H04N 5/272* (2006.01)
*G06V 10/22* (2022.01)
(Continued)

(52) U.S. Cl.
CPC ............. *H04N 5/272* (2013.01); *G06V 10/22* (2022.01); *G06V 20/41* (2022.01); *G06V 20/46* (2022.01);
(Continued)

(58) Field of Classification Search
CPC ........ H04N 5/144; H04N 5/272; G06V 20/41; G06V 20/49; G06V 10/22; G06V 20/46;
(Continued)

(56) References Cited

U.S. PATENT DOCUMENTS

2020/0380686 A1* 12/2020 Schlueter .................. G06T 5/40
2020/0402243 A1* 12/2020 Benou .................. G06V 10/454

FOREIGN PATENT DOCUMENTS

WO  WO-2022025359 A1 *  2/2022  ........... G06N 3/0454
WO  WO-2022045485 A1 *  3/2022  ............. G06V 10/82

OTHER PUBLICATIONS

K. R. Prajwal et al., "Towards Automatic Face-to-Face Translation," Proceedings of the 27th ACM International Conference on Multimedia, arXiv:2003.00418v1, Mar. 1, 2020, 9 pages.
(Continued)

*Primary Examiner* — Thai Q Tran
*Assistant Examiner* — Nienru Yang
(74) *Attorney, Agent, or Firm* — Ryan, Mason & Lewis, LLP

(57) ABSTRACT

Embodiments of the present disclosure relate to a method, an electronic device, and a computer program product for video reconstruction. The method for video reconstruction includes: receiving a video segment comprising a plurality of image frames. The method further includes: determining an audio segment corresponding to the video segment. The method further includes: acquiring a plurality of mask maps corresponding to the plurality of image frames, respectively. The method further includes: reconstructing the video segment based on the audio segment, the plurality of image frames, and the plurality of mask maps.

20 Claims, 11 Drawing Sheets

(51) Int. Cl.
  *G06V 20/40* (2022.01)
  *H04N 5/14* (2006.01)
(52) U.S. Cl.
  CPC ............. *G06V 20/49* (2022.01); *H04N 5/144* (2013.01); *G06V 2201/07* (2022.01)
(58) Field of Classification Search
  CPC .... G06V 40/16; G06V 2201/07; G11B 5/265; G11B 27/028; G11B 2020/10898
  USPC ........................................................ 386/287
  See application file for complete search history.

(56) References Cited

OTHER PUBLICATIONS

K. R. Prajwal et al., "A Lip Sync Expert is All You Need for Speech to Lip Generation in the Wild," Proceedings of the 28th ACM International Conference on Multimedia, arXiv:2008.10010v1, Aug. 23, 2020, 10 pages.

C. Chan et al., "Everybody Dance Now," Proceedings of the IEEE/CVF International Conference on Computer Vision, Oct./Nov. 2019, pp. 5933-5942.

W. Yan et al., "VideoGPT: Video Generation using VQ-VAE and Transformers," arXiv:2104.10157v2, Sep. 14, 2021, 14 pages.

X. Wang et al., "EDVR: Video Restoration with Enhanced Deformable Convolutional Networks," IEEE/CVF Conference on Computer Vision and Pattern Recognition Workshops, arXiv:1905.02716v1, May 7, 2019, 10 pages.

M. Haris et al., "Recurrent Back-Projection Network for Video Super-Resolution," Conference on Computer Vision and Pattern Recognition, arXiv:1903.10128v1, Mar. 25, 2019, 13 pages.

K. C. K. Chan et al., "BasicVSR: The Search for Essential Components in Video Super-Resolution and Beyond," IEEE/CVF Conference on Computer Vision and Pattern Recognition, arXiv:2012.02181v2, Apr. 7, 2021, 14 pages.

J. Liang et al., "VRT: A Video Restoration Transformer," arXiv:2201.12288v2, Jun. 15, 2022, 14 pages.

A. Dosovitskiy et al., "FlowNet: Learning Optical Flow with Convolutional Networks," International Conference on Computer Vision, Dec. 2015, pp. 2758-2766.

G. Te et al., "AGRNet: Adaptive Graph Representation Learning and Reasoning for Face Parsing," IEEE Transactions on Image Processing, arXiv:2101.07034v3, Sep. 17, 2021, 16 pages.

\* cited by examiner

METHOD, ELECTRONIC DEVICE, AND COMPUTER PROGRAM PRODUCT FOR VIDEO RECONSTRUCTION

RELATED APPLICATION(S)

The present application claims priority to Chinese Patent Application No. 202210875518.4, filed Jul. 22, 2022, and entitled "Method, Electronic Device, and Computer Program Product for Video Reconstruction," which is incorporated by reference herein in its entirety.

FIELD

Embodiments of the present disclosure relate to the field of image processing, and more particularly, to a method, an electronic device, and a computer program product for video reconstruction.

BACKGROUND

With the ongoing development of communication technology and the continuous emergence of various terminal devices, users are able to produce videos, watch videos, or communicate through videos more conveniently. In order to better enhance the user experience, it is expected to provide users with videos having at least high resolution and audio-video synchronization.

SUMMARY

Embodiments of the present disclosure provide a method, an electronic device, and a computer program product for video reconstruction.

According to a first aspect of the present disclosure, a method for video reconstruction is provided. The method includes: receiving a video segment comprising a plurality of image frames. The method further includes: determining an audio segment corresponding to the video segment. The method further includes: acquiring a plurality of mask maps corresponding to the plurality of image frames, respectively. The method further includes: reconstructing the video segment based on the audio segment, the plurality of image frames, and the plurality of mask maps.

According to a second aspect of the present disclosure, an electronic device is provided. The electronic device includes at least one processor; and a memory coupled to the at least one processor and having instructions stored thereon, wherein the instructions, when executed by the at least one processor, cause the device to execute actions including: receiving a video segment comprising a plurality of image frames; determining an audio segment corresponding to the video segment; acquiring a plurality of mask maps corresponding to the plurality of image frames, respectively; and reconstructing the video segment based on the audio segment, the plurality of image frames, and the plurality of mask maps.

According to a third aspect of the present disclosure, a computer program product is provided, which is tangibly stored on a non-transitory computer-readable medium and includes machine-executable instructions, wherein the machine-executable instructions, when executed by a machine, cause the machine to perform steps of the method in the first aspect of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

In the drawings, identical or corresponding numerals represent identical or corresponding parts.

DETAILED DESCRIPTION

Embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

In order to provide users with videos of higher quality (e.g., with higher resolution, audio-video synchronization, etc.), there a number of available video processing methods.

However, videos generated by these techniques are often blurry and of low resolution, and thus still cannot meet the expectations of users.

To address at least the above and other potential problems, embodiments of the present disclosure provide a method for video reconstruction. The method includes: receiving a video segment comprising a plurality of image frames. The method further includes: determining an audio segment corresponding to the video segment. The method further includes: acquiring a plurality of mask maps corresponding to the plurality of image frames, respectively. The method further includes: reconstructing the video segment based on the audio segment, the plurality of image frames, and the plurality of mask maps. This method makes effective use of audio information during video reconstruction, which can greatly improve the audio-video synchronization in a video while reducing the amount of computation and saving time for video processing, and can also obtain a video with higher resolution, thus greatly enhancing the viewing experience of users.

Figure 1:
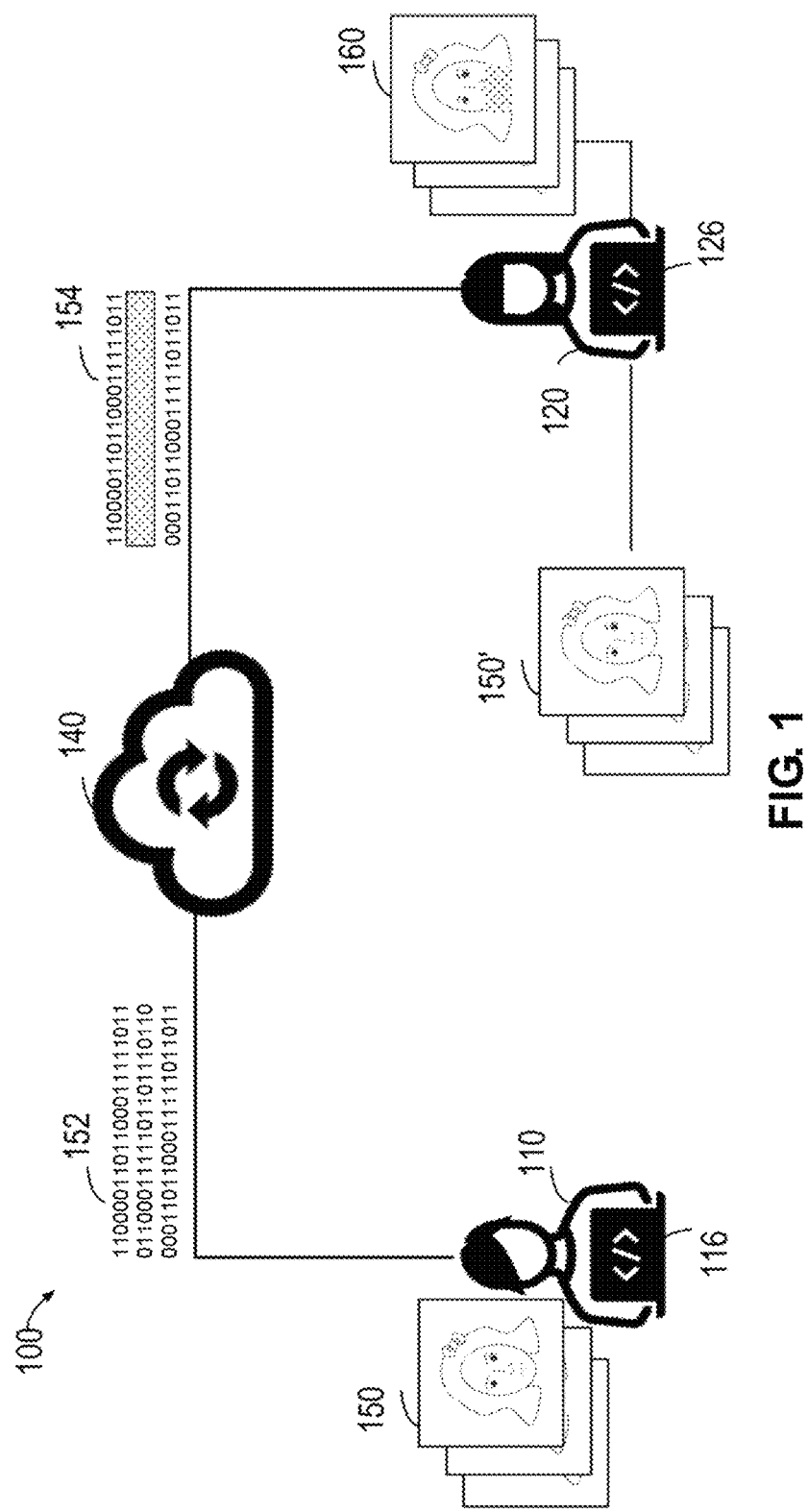
FIG. 1 illustrates a schematic diagram of an example environment in which a device and/or a method according to embodiments of the present disclosure can be implemented.

Embodiments of the present disclosure will be further described in detail with reference to the accompanying drawings below. FIG. 1 is a schematic diagram of an example environment 100 in which embodiments of the present disclosure can be implemented.

An illustration is provided below with example environment 100 in which user 110 sends video segment 150 to user 120. In example environment 100, user 110 may send video segment 150 to user 120 via network 140. Video segment 150 may include a video segment stored in computing device 116 of user 110 or may include a video segment captured in real time by user 110 via a video capture device (such as a camera) of computing device 116, and the present disclosure does not limit the source of the video and the way in which the video is acquired. In addition, depending on the actual application situation, video segment 150 may have different resolutions, such as 720P, 1080P, and 4K, and the present disclosure does not limit the resolution of video segment 150.

In one embodiment, video segment 150 includes a plurality of video image frames 150*i* (i being a positive integer greater than or equal to 1). It should be understood that the present disclosure does not limit the number of image frames in video segment 150, and the video segment according to embodiments of the present disclosure may include a video of any length, and the present disclosure does not limit the length of the video segment, either. In addition, a video segment according to embodiments of the present disclosure may include a complete segment of video, or may include a portion of video from a complete segment of video, which is not limited in the present disclosure.

Computing device 116 of user 110 may encode and compress video segment 150 and send encoded video stream 152 to user 120 via network 140. Network 140 includes, but is not limited to, various types of networks such as the Internet, a local area network, and a wireless network, which is not limited in the present disclosure. It can be understood that a transmitted video stream may be damaged during transmission due to the impact of transmission delays or due to the impact of conditions such as improper compression or network failures during transmission, as shown in FIG. 1, where some information may be lost in video stream 154 received by user 120 (in FIG. 1, a block with a filling pattern is used to cover part of video stream 154 to indicate that the information in the corresponding part is lost). Accordingly, video segment 160 obtained after decoding and decompressing the received video stream 154 by computing device 126 of user 120 will also lose some information, as shown in video segment 160 in FIG. 1.

In such case, damaged video segment 160 may be reconstructed by employing the method for video reconstruction according to an embodiment of the present disclosure, thereby obtaining reconstructed video segment 150'. For example, damaged video segment 160 may be reconstructed by local computing device 126 of user 120, or by a server to which it is uploaded, thereby resulting in reconstructed video segment 150'.

The present disclosure does not limit the type of a computing device that performs the method for video reconstruction according to embodiments of the present disclosure. For example, the computing device may include, but is not limited to, a personal computer, a server computer, a handheld or laptop device, a mobile device (such as a mobile phone, a personal digital assistant (PDA), and a media player), a multi-processor system, a consumer electronic product, a wearable electronic device, a smart home device, a minicomputer, a mainframe computer, an edge computing device, a distributed computing environment including any of the above systems or devices, etc. When performing video reconstruction, the computing device may receive video segment 150 including a plurality of image frames, determine an audio segment corresponding to video segment 150, acquire a plurality of mask maps corresponding to the plurality of image frames, respectively, and reconstruct the video segment based on the audio segment, the plurality of image frames, and the plurality of mask maps.

Although the video reconstruction in the video transmission scenario is described above in conjunction with FIG. 1, it can be understood by a person skilled in the art that the method for video reconstruction according to embodiments of the present disclosure may not be limited to the scenario described above, but may also be used as needed in any scenario where reconstruction of a video is required, and the present disclosure does not limit the application scenario. The method according to embodiments of the present disclosure makes effective use of audio information during video reconstruction, which can greatly improve the audio-video synchronization in a video while reducing the amount of computation and saving time for video processing, and can also obtain a video with higher resolution, thus greatly enhancing the viewing experience of users.

A block diagram of example environment 100 in which embodiments of the present disclosure can be implemented has been described above with reference to FIG. 1. A flow chart of method 200 for video reconstruction according to an embodiment of the present disclosure is described below in conjunction with FIG. 2. Method 200 can be performed at computing device 126 of user 120 in FIG. 1 or at any suitable computing device.

At block 202, computing device 126 may receive a video segment including a plurality of image frames. As described above in conjunction with FIG. 1, computing device 126 may receive video segment 150 sent from user 110 via network 140. The processed and transmitted video segment 150 may be damaged during processing and/or transmission and lose information. Therefore, video segment 160 received by computing device 126 may be in need of repair through video reconstruction, and video segment 160 includes a plurality of image frames 160*i* (i being a positive integer greater than or equal to 1). Further, image frames 160*i* correspond to video image frames 150*i*.

At block 204, computing device 126 may determine an audio segment corresponding to the video segment. In one embodiment, computing device 126 may extract a corresponding audio segment $A_{seg}$ from the received video segment by means of existing audio extraction techniques or future-developed audio extraction techniques. The extracted audio segment $A_{seg}$ will be combined in a subsequent process for use in reconstructing the video segment.

At block 206, computing device 126 may acquire a plurality of mask maps corresponding to the plurality of image frames, respectively. In one embodiment, the mask map may include a binary image, for example, a region of interest in the mask map is set to have a pixel value of 255 and the remaining regions in the image are set to have a pixel value of 0. For image frames 160i, they may correspond to mask maps Mi.

The mask maps may be obtained by means of various known or future-developed techniques. In one embodiment, computing device 126 may perform target detection on the plurality of image frames, respectively, to obtain the region of interest (e.g., a foreground target region) through detection. Computing device 126 may set the pixel value of the target region detected from the plurality of image frames to a first pixel value, e.g., pixel value of 255, and set the pixel values of regions in the plurality of image frames other than the target region to a second pixel value, e.g., pixel value of 0. In this way, computing device 126 can obtain a mask map corresponding to at least one image frame (e.g., each image frame) in video segment 160. In another embodiment, the computing device may also obtain a mask map by calculating pixel value differences between pixels in an image frame, categorizing and combining pixels between which the pixel value difference is greater than a threshold, respectively, and performing binarization processing on the categorized pixels.

It can be understood that the above implementation for acquiring a mask map is only an example, and that in other embodiments, computing device 126 may also upload video segment 160 to a server for the server to acquire a mask map corresponding to each image frame in video segment 160, and then receive the mask map from the server for use in reconstructing video segment 160. The present disclosure does not limit the manner in which the mask map is acquired.

At block 208, computing device 126 reconstructs video segment 160 based on the audio segment $A_{seg}$, the plurality of image frames 160i, and the plurality of mask maps Mi to obtain reconstructed video segment 150'. By utilizing the audio segment $A_{seg}$ and the mask map Mi, not only can the lost information in video segment 160 be supplemented, but reconstructed video segment 150' can also be synchronized (e.g., frame-synchronized) with the audio segment $A_{seg}$, such that user 120 can obtain a video segment with higher resolution and more consistent synchronization compared with video segment 150 originally sent, whereby the viewing experience of user 120 is greatly enhanced. A specific implementation for reconstructing video segment 160 will be described in detail below in conjunction with the accompanying drawings.

This method makes effective use of audio information during video reconstruction, which can greatly improve the audio-video synchronization in a video while reducing the amount of computation and saving time for video processing, and can also obtain a video with higher resolution, thus greatly enhancing the viewing experience of users.

Figure 2:
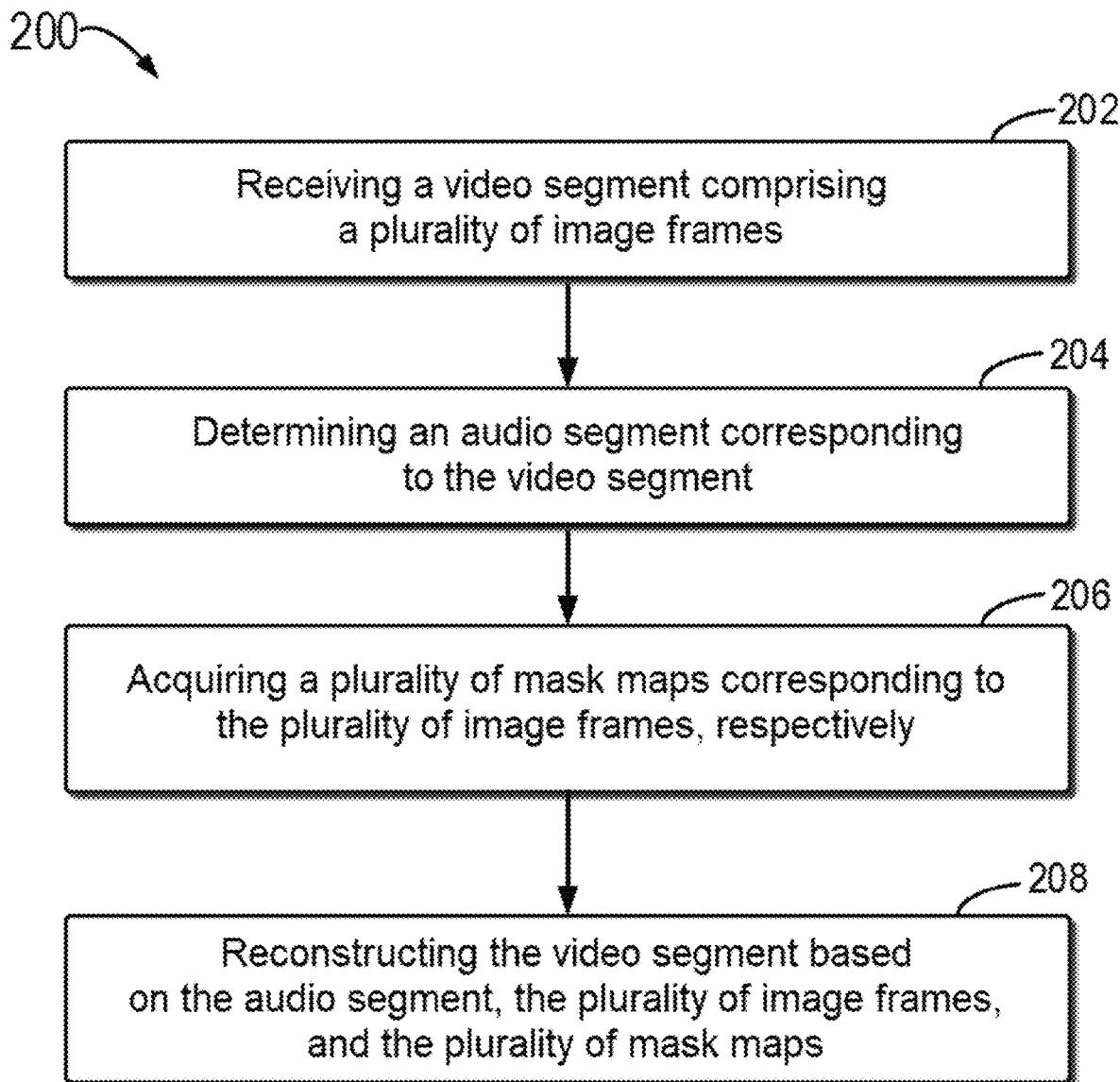
FIG. 2 illustrates a flow chart of a method for video reconstruction according to an embodiment of the present disclosure.
Figure 3:
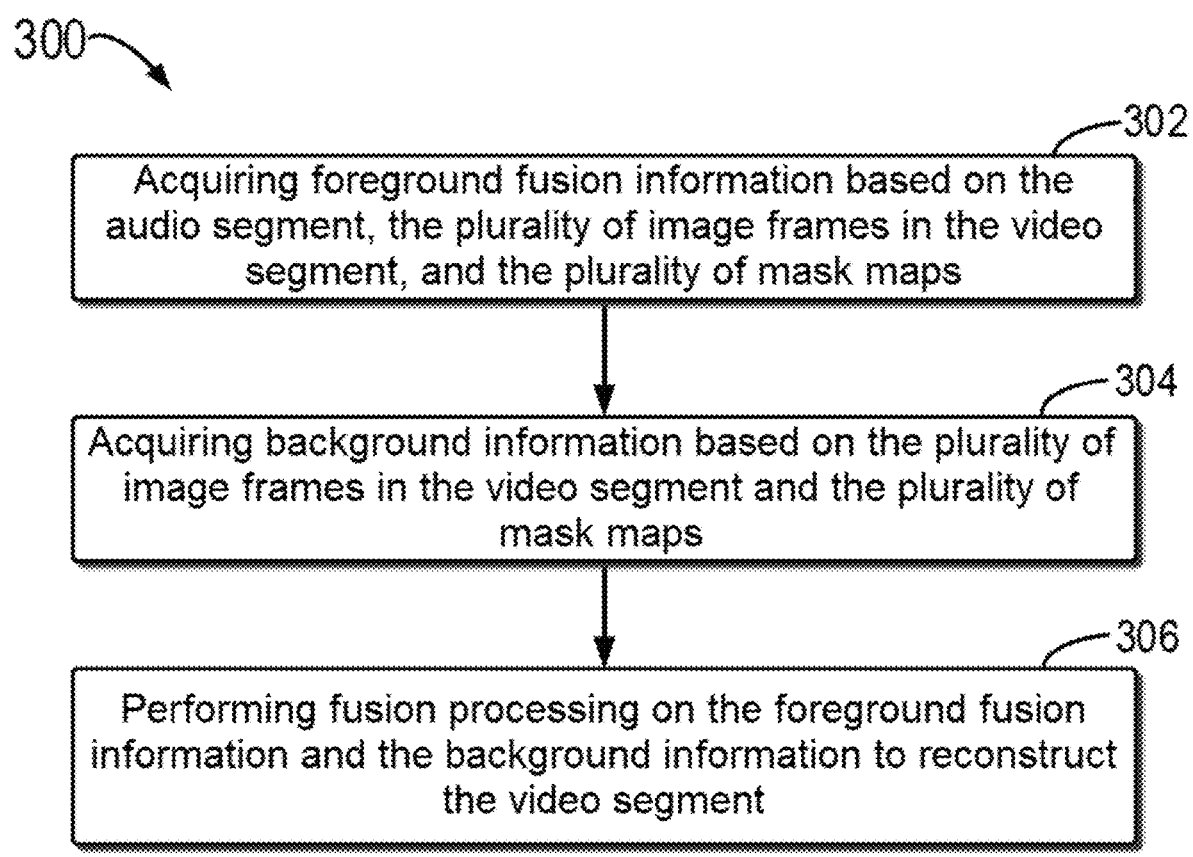
FIG. 3 illustrates a flow chart of a method for reconstructing a video segment according to an embodiment of the present disclosure.

A flow chart of a method 300 (i.e., a specific implementation corresponding to block 208 in FIG. 2) for reconstructing a video segment in a video reconstruction process according to an embodiment of the present disclosure will be described below in conjunction with FIG. 3. Method 300 can be performed at computing device 126 of user 120 in FIG. 1 or at any suitable computing device. The process of implementing method 300 in FIG. 3 may be described in conjunction with the schematic diagram of video reconstruction architecture 400 in FIG. 4. It can be understood that video reconstruction architecture 400 may be deployed at computing device 126. In addition, video reconstruction architecture 400 may also be deployed at a server side, which is not limited in the present disclosure. Further, an illustration will be provided below through an example in which computing device 126 performs method 300 for video reconstruction according to embodiments of the present disclosure and video reconstruction architecture 400 is deployed at computing device 126.

At block 302, computing device 126 acquires foreground fusion information based on the audio segment, the plurality of image frames in the video segment, and the plurality of mask maps.

Figure 4:
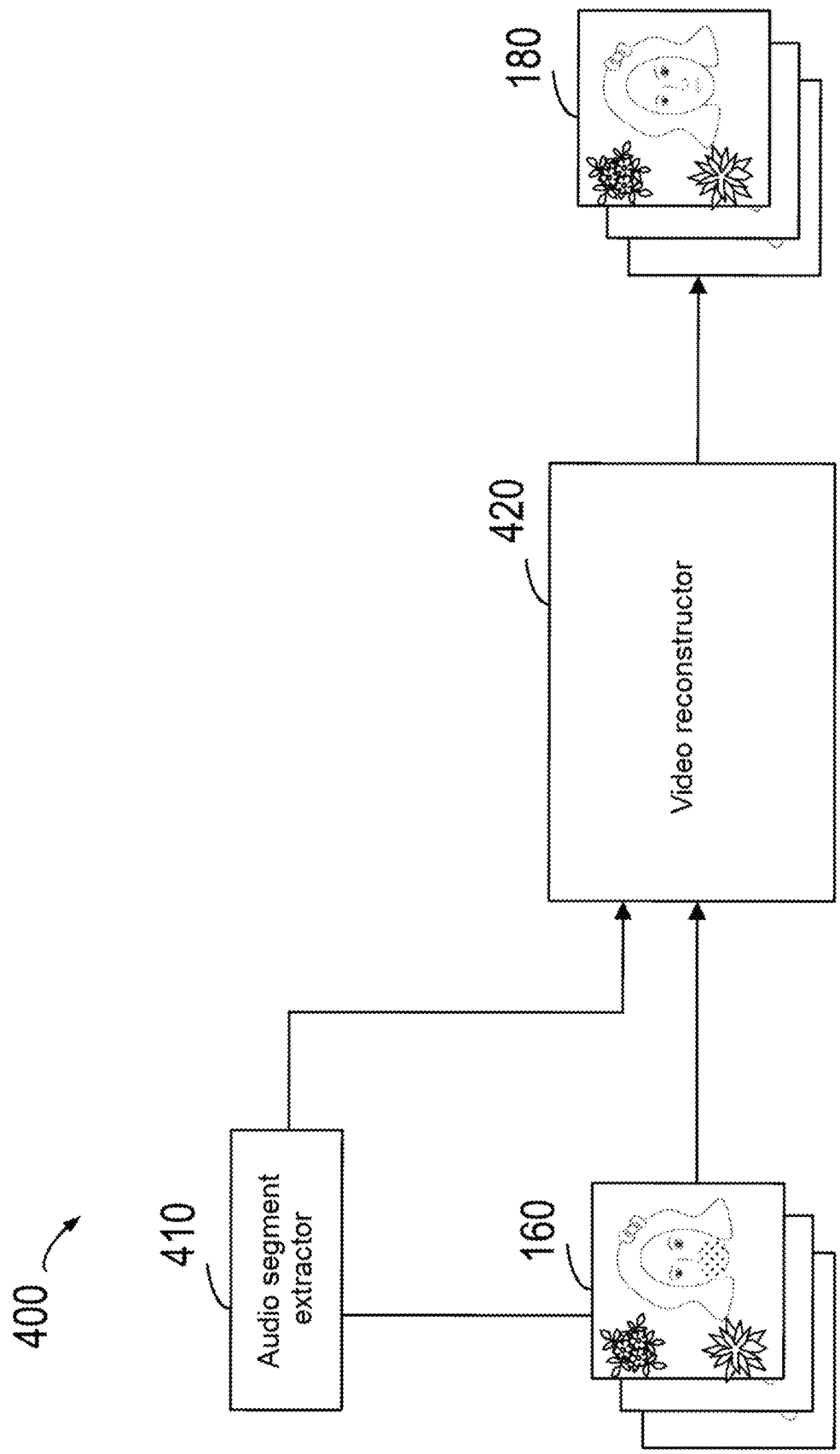
FIG. 4 illustrates a schematic block diagram of an architecture for video reconstruction according to an embodiment of the present disclosure.

As shown in FIG. 4, video reconstruction architecture 400 includes audio segment extractor 410 and video reconstructor 420. Audio segment extractor 410 can be used to extract an audio segment from the video segment, and video reconstructor 420 reconstructs the received video segment 160. Each image frame 160i in FIG. 4 may include a foreground target and a background region. For example, the foreground target region of the image frame 160i in FIG. 4 is a target face region, and the background region is a plurality of plants.

In one embodiment, audio segment extractor 410 receives video segment 160 and extracts an audio segment from video segment 160. The manner in which the audio segment is extracted has been described above and will not be repeated here for the sake of brevity. Audio segment extractor 410 inputs the extracted audio segment $A_{seg}$ into video reconstructor 420, and video reconstructor 420 may acquire foreground fusion information based on the audio segment $A_{seg}$, the plurality of image frames in video segment 160, and the corresponding plurality of mask maps. The specific implementation for acquiring foreground information will be described below.

At block 304, computing device 126 may acquire background information based on the plurality of image frames in the video segment and the corresponding plurality of mask maps. In one embodiment, video reconstructor 420 may acquire the background information based on the plurality of image frames in the video segment and the corresponding plurality of mask maps.

At block 306, computing device 126 performs fusion processing on the foreground fusion information and the background information to reconstruct the video segment, so as to obtain the reconstructed video segment. In one embodiment, video reconstructor 420 may perform fusion processing on the foreground fusion information and the background information to reconstruct the video segment.

Figure 5:
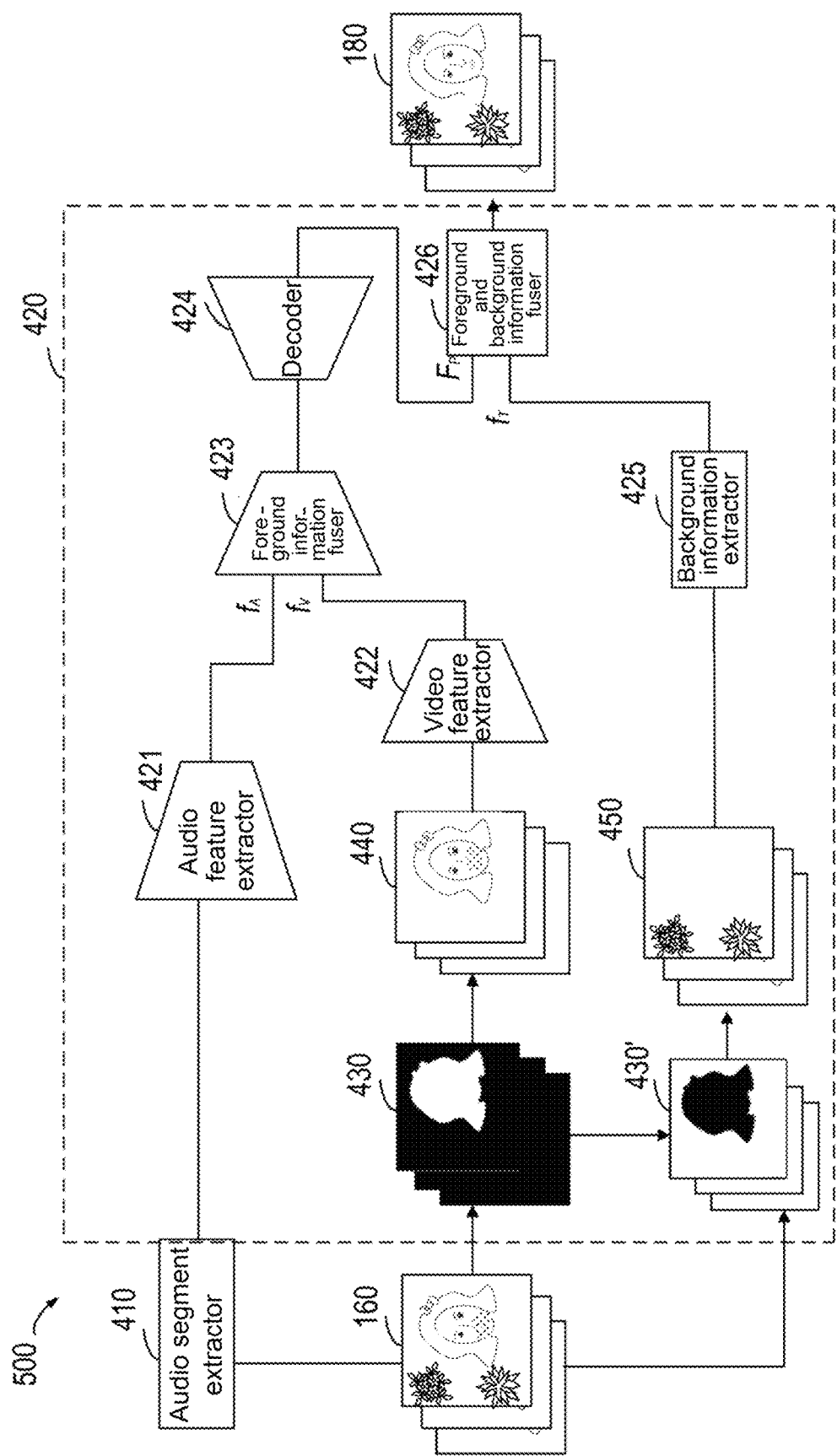
FIG. 5 illustrates a schematic detailed block diagram of an architecture for video reconstruction according to an embodiment of the present disclosure.

A specific implementation of method 300 described above will be described in detail below in conjunction with FIG. 5. FIG. 5 is a detailed block diagram of architecture 500 according to an embodiment of the present disclosure for implementing the video reconstruction method according to embodiments of the present disclosure. It can be understood that the block diagram in FIG. 5 is only schematic for the purpose of illustration. Depending on actual needs, other parts and components may also be included in FIG. 5, which is not limited in the present disclosure. Architecture 500 shown in FIG. 5 may be implemented in computing device 126 or may be implemented in a server, etc., which is not limited in the present disclosure.

As shown in FIG. 5, architecture 500 includes audio segment extractor 410 and video reconstructor 420. Audio segment extractor 410 can be used to extract an audio segment from the video segment, and video reconstructor 420 reconstructs the received video segment 160. Video reconstructor 420 includes audio feature extractor 421, video feature extractor 422, foreground information fuser 423, decoder 424, background information extractor 425, and foreground and background information fuser 426. Video reconstructor 420 may perform the video reconstruction method according to embodiments of the present disclosure. Accordingly, video reconstructor 420 may perform method 300 shown in FIG. 3.

In one embodiment, audio feature extractor 421 in video reconstructor 420 may receive the audio segment $A_{seg}$ and extract an audio feature $f_A$ of the audio segment $A_{seg}$. Specifically, audio feature extractor 421 may extract the Mel spectrum of the audio segment $A_{seg}$ to obtain a two-dimensional frequency map $A \in R^{dim_f \times d}$ of the audio segment $A_{seg}$, thereby acquiring feature information of the audio segment $A_{seg}$, e.g., feature vector $f_A$, where $dim_f$ is the number of filters used to extend the frequency band, and d is the length of each feature vector $f_A$ extracted by audio feature extractor 421. In one embodiment, $dim_f=64$, and d=1024.

Video reconstructor 420 may receive the plurality of image frames 160i in video segment 160, where each of the image frames 160i may include a foreground target and a background region. Taking image frames 160i in FIG. 5 as an example, the foreground target region of the image frames 160i is a target face region, and the background region is a plurality of plants. Video reconstructor 420 may also acquire a mask map 430i corresponding to each of the image frames 160i. The implementation of the acquisition of mask map 430 has been described above and will not be repeated here. Video reconstructor 420 may use the plurality of mask maps 430i to process the corresponding plurality of image frames 160i in video segment 160, respectively (e.g., by means of dot multiplication of mask maps 430i with corresponding image frames 160i), so as to acquire the plurality of mask-processed foreground image frames 440i (as shown in FIG. 5). The background pixel value in the mask-processed foreground image frames 440i is 255 so that the foreground target region can be highlighted.

For the plurality of mask-processed foreground image frames 440i, video feature extractor 422 in video reconstructor 420 may extract foreground video feature $f_V$ in the plurality of mask-processed foreground image frames 440i. Foreground information fuser 423 may receive audio feature $f_A$ from audio feature extractor 421 and foreground video feature $f_V$ from video feature extractor 422, and acquire the foreground fusion information based on the audio feature $f_A$ and the foreground video feature $f_V$. In one embodiment, foreground information fuser 423 may perform normalization processing on the audio feature $f_A$ and the foreground video feature $f_V$, respectively, and concatenate the normalized audio feature with the normalized foreground video feature to acquire foreground fusion information, and decoder 424 performs a decoding operation on the foreground fusion information to acquire the decoded feature $F_P$, as shown in Equation 1 below:

$$F_P = P(f_V, f_A) = P[\text{concat}(\text{norm}(f_V), \text{norm}(f_A))] \quad \text{(Equation 1)}$$

where function P denotes the decoding processing, function concat denotes the concatenation operation, and function norm denotes the normalization processing on parameters.

As a result of the above processing, video reconstructor 420 may acquire foreground fusion information based on the audio segment $A_{seg}$, the plurality of image frames 160i in video segment 160, and the corresponding plurality of mask maps 430i.

Background information extractor 425 in video reconstructor 420 may be used to acquire background information. In one embodiment, video reconstructor 420 may acquire complementary mask maps 430' corresponding to the plurality of mask maps 430, that is, the pixel value of the target region in the image is set to 0, and the pixel values of regions in the image other than the target region are set to 255, and the corresponding complementary mask maps 430' can be acquired.

Video reconstructor 420 processes image frames 160i in video segment 160 using complementary mask maps 430' corresponding to mask maps 430, for example, by performing dot multiplication processing on the plurality of image frames 160i in video segment 160 and the corresponding complementary mask maps 430'i to acquire complementary mask-processed plurality of background image frames 450i, where as shown in FIG. 5, background image frames 450i may display only images of the background region. Background information extractor 425 receives generated background image frames 450i and extracts the image feature $f_T$ in the above complementary mask-processed plurality of background image frames 450i as the background information.

Foreground and background information fuser 426 in video reconstructor 420 performs fusion processing on the foreground fusion information and the background information to reconstruct the video segment. Specifically, foreground and background information fuser 426 may perform convolution processing on the plurality of mask maps 430i and acquire the corresponding mask features f(α), determine the complementary mask features (1−f(α)) corresponding to the mask features, and reconstruct the video segment based on the complementary mask features (1−f(α)) and the foreground fusion information as well as the mask features f(α) and the background information, so as to acquire reconstructed video segment 180.

As described above, foreground fusion information includes foreground features, e.g., foreground features $F_P$ obtained through decoding by decoder 424, and the background information includes background features, e.g., image features $f_T$ obtained via background information extractor 425. Foreground and background information fuser 426 may perform convolution processing on the plurality of mask maps 430i to obtain the mask features f(α), and foreground and background information fuser 426 may determine the complementary mask features $f_{con}=(1-f(α))$ corresponding to the mask features f and acquire the video feature $F_U$ of the reconstructed video segment 180 based on the complementary mask features $f_{con}$ and the foreground fusion information as well as the mask features f(α) and the background information $f_T$, so as to reconstruct the video segment. The above operations may be reflected by the following Equation 2:

$$F_U = U(F_P, f_T, α) = U[f(α) \times f_T + (1-f(α)) \times F_P] \quad \text{(Equation 2)}$$

where f(α) denotes the convolution processing on the mask maps to obtain the mask features f, and (1−f(α)) denotes the determination of the complementary mask features corresponding to the mask features f.

By the above operation, foreground and background information fuser 426 can obtain the features of the reconstructed video for use in reconstructing video segment 180.

An example embodiment illustrating feature acquisition for use in reconstructing video 160 has been described above in conjunction with FIGS. 3-5. This method makes effective use of audio information during video reconstruction, which can greatly improve the audio-video synchronization in a video while reducing the amount of computation and saving time for video processing, and can also obtain a video with higher resolution, thus greatly enhancing the viewing experience of users.

Video reconstructor 420 described in FIG. 5 includes audio feature extractor 421, video feature extractor 422, foreground information fuser 423, decoder 424, background information extractor 425, and foreground and background information fuser 426, and each of the above components may be implemented by means of a neural network model. The specific structure of the models will be described below in conjunction with FIG. 6 so that the implementation of the solution for video reconstruction according to embodiments of the present disclosure can be more easily understood by those skilled in the art.

Figure 6:
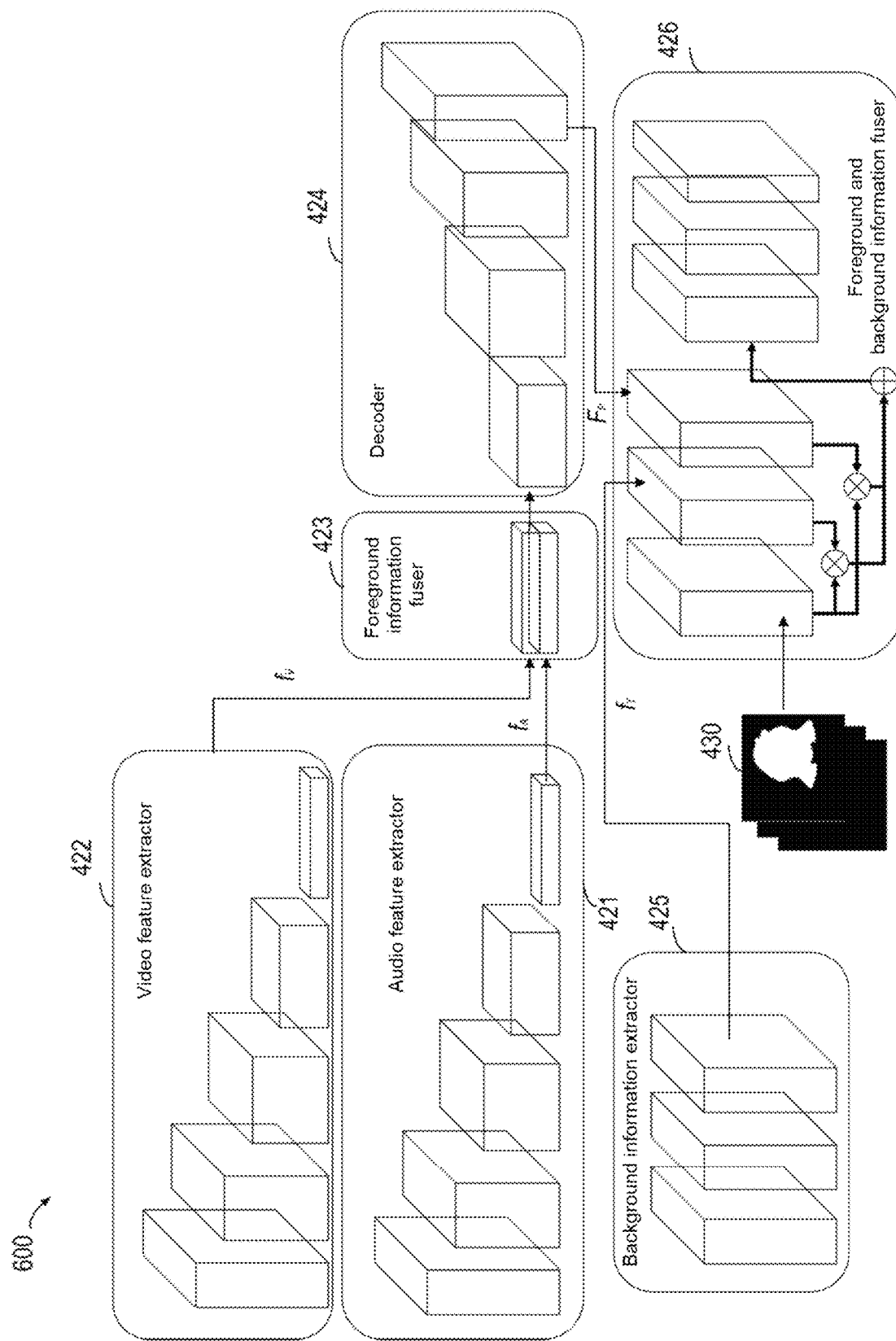
FIG. 6 illustrates a schematic model diagram of components in an architecture for video reconstruction according to an embodiment of the present disclosure.

FIG. 6 illustrates specific structural diagram 600 of components in the video reconstructor according to an embodiment of the present disclosure. As shown in FIG. 6, audio feature extractor 421, video feature extractor 422, foreground information fuser 423, decoder 424, background information extractor 425, and foreground and background information fuser 426 included in video reconstructor 420 may be implemented by means of a neural network model. The present disclosure does not limit the specific implementation of each model, and various known and future-developed neural network models may be used based on the needs of a processing task to be implemented.

For example, video feature extractor 422 and audio feature extractor 421 may perform feature extraction on image frames and audio segments in the video segment, respectively, so as to acquire corresponding image features $f_V$ and audio features $f_A$. Foreground information fuser 423 may concatenate the image features $f_V$ and audio features $f_A$ after normalization, and input the concatenated features to decoder 424, and then decoder 424 decodes them and inputs the decoded feature information to foreground and background information fuser 426. Furthermore, background information extractor 425 may extract the background information of the video image frames in the manner described above and input the extracted background information to foreground and background information fuser 426. Foreground and background information fuser 426 may also receive mask maps 430$i$ corresponding to the plurality of video image frames 160$i$, perform convolution processing on mask maps 430$i$ to acquire the corresponding mask features, and perform dot multiplication processing on the mask features and the background information to obtain a first result. Foreground and background information fuser 426 may also determine the complementary mask features corresponding to the mask features and perform dot multiplication processing on the complementary mask features and the foreground fusion information to obtain a second result. Afterwards, foreground and background information fuser 426 may also superimpose the first result with the second result, thus obtaining the feature $F_U$ of the reconstructed video. Reconstructed video 180 may be obtained by performing operations such as full connection on the feature $F_U$ of the reconstructed video.

The structural diagrams of the components in the video reconstruction architecture according to an embodiment of the present disclosure have been described above in conjunction with FIG. 5 and FIG. 6. The above structure realize video reconstruction in a simple and efficient manner, reduces system power consumption, increases computing speed, and can also obtain videos with higher resolution and more consistent synchronization, thus greatly enhancing the viewing experience of users.

In one embodiment, the video reconstruction method according to embodiments of the present disclosure may further receive a reference image and migrate the style of the reconstructed video to the style of the reference image based on the style of the reference image, thereby enriching users' options and enhancing users' experience.

The reconstruction and generation of a reconstructed video with a style migration effect based on the reference image will be described below in conjunction with FIG. 7 and FIG. 8 on the basis of FIG. 5 and FIG. 6.

Figure 7:
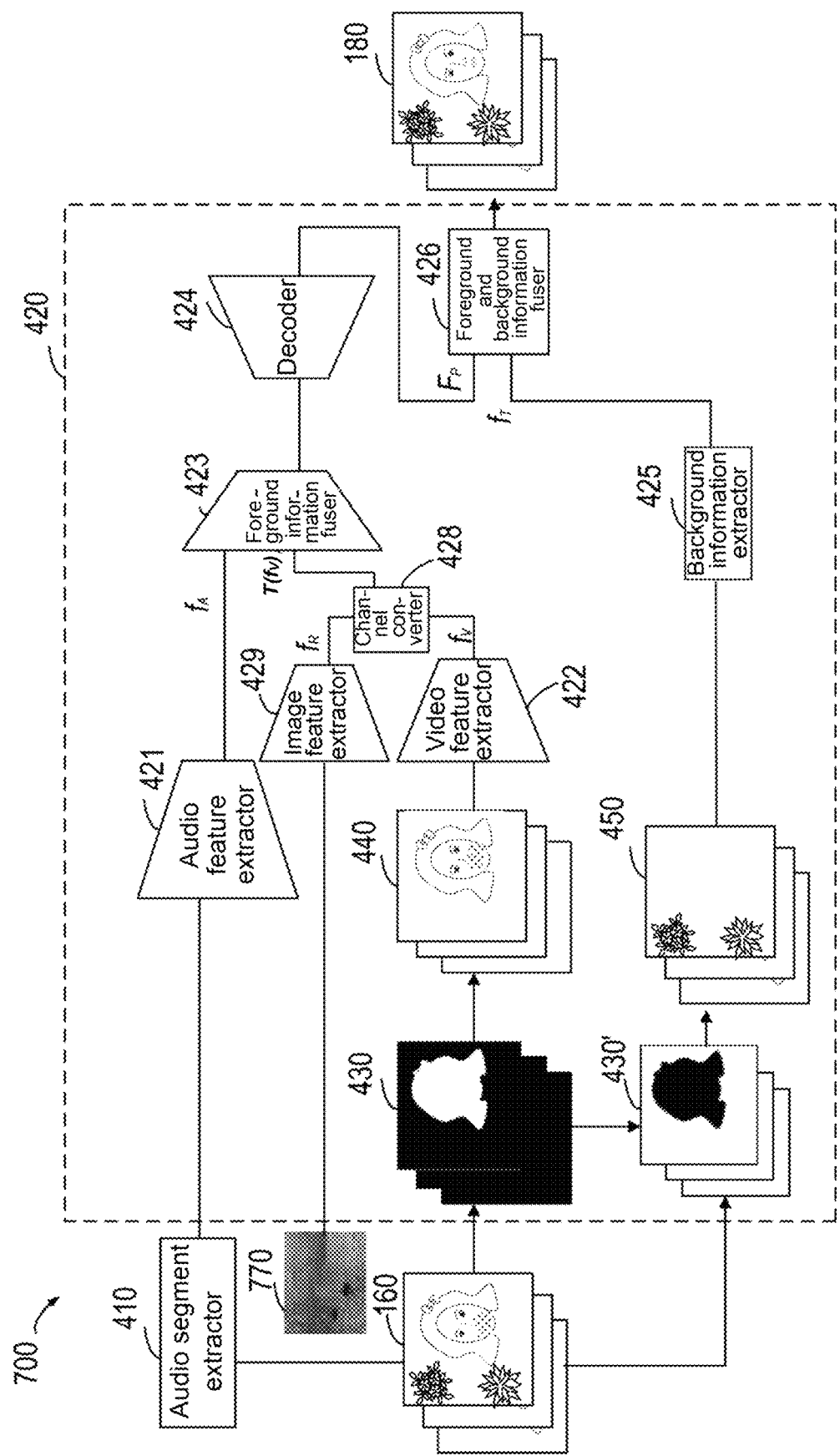
FIG. 7 illustrates a schematic detailed block diagram of an architecture for video reconstruction according to another embodiment of the present disclosure.

Compared with architecture 500 in FIG. 5, video reconstruction architecture 700 illustrated in FIG. 7 adds channel converter 428 and image feature extractor 429, wherein image feature extractor 429 may be used to receive reference image 770 and extract image features in reference image 770. Channel converter 428 may be used to convert foreground video feature f v to the image channel where reference image 770 is located using the reference image features extracted by image feature extractor 429. The reference image may include an image having a certain style. For example, as shown in FIG. 7, reference image 770 in FIG. 7 may be an image in the oil painting style. It may be understood that the user may select various types and styles of reference images as needed, which is not limited in the present disclosure.

Image feature extractor 429 may use various types of neural network models known in the field and to be developed in the future to perform feature extraction on the reference image, and the present disclosure does not limit the specific structure and implementation manner of the image feature extractor. Image feature extractor 429 extracts the reference image features $f_R$. Afterwards, video reconstructor 420 may process the foreground video features $f_V$ using the acquired reference image features $f_R$ to convert foreground video features $f_V$ to the image channel where reference image 770 is located and concatenate the channel-converted foreground video features with the audio features $f_A$ to acquire channel-converted foreground fusion information. Specifically, channel converter 428 may convert the foreground video features $f_V$ to the image channel where reference image 770 is located according to the following Equation 3:

$$T(f_V) = \frac{f_V - \mu(V)}{\sigma(V)} \times \sigma(R) + \mu(R) \qquad \text{(Equation 3)}$$

where the functions $\mu$ and $\sigma$ are the mean and variance of the parameters, respectively, R denotes the reference image features, and V denotes the features of the video image frames.

With the above Equation 3, the channel-converted foreground video features $T(f_V)$ can be acquired, and the channel-converted foreground video features $T(f_V)$ can be fused together with the audio features $f_A$ via foreground information fuser 423 to obtain foreground information. The specific implementation is similar to that described above in conjunction with FIG. 5 and will not be repeated here for the sake of brevity. In one embodiment, foreground and background information fuser 426 may fuse the foreground information and the background information to reconstruct the video segment. For example, foreground and background information fuser 426 may perform convolution processing on the plurality of mask maps and acquire the corresponding mask features, and foreground and background information fuser 426 may further determine complementary mask features corresponding to the mask features and reconstruct the video segment based on the complementary mask features and the channel-converted foreground fusion information $T(f_V)$, as well as the acquired corresponding mask features and the background information The specific implementation is similar to that for foreground and background information fuser 426 described above in conjunction with FIG. 5 and will not be repeated here for the sake of brevity.

Figure 8:
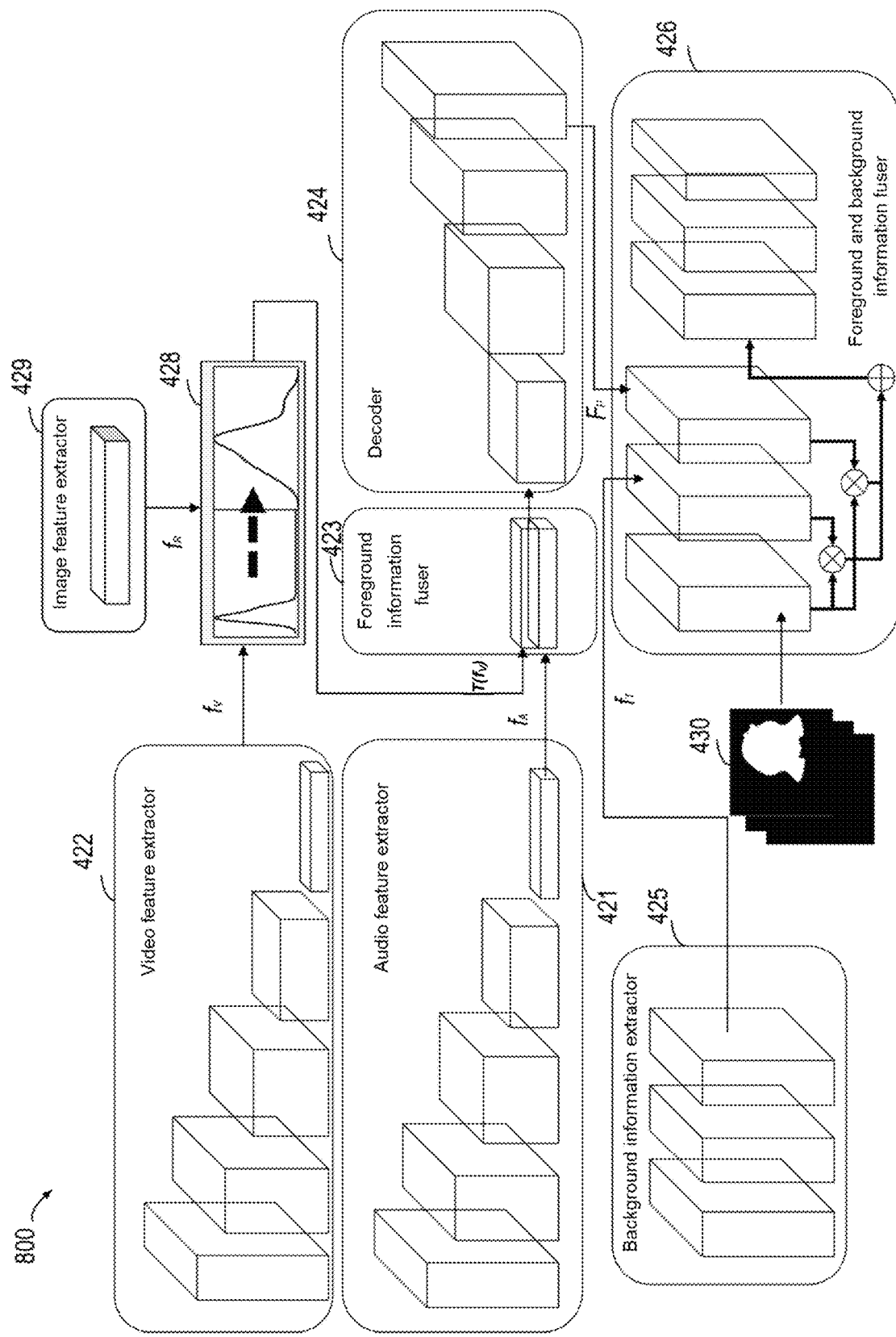
FIG. 8 illustrates a schematic model diagram of components in an architecture for video reconstruction according to another embodiment of the present disclosure.

Similar to FIG. 6, FIG. 8 illustrates specific structural diagram 800 of components in video reconstructor 420 according to an embodiment of the present disclosure. As shown in FIG. 8, a schematic effect diagram of channel converter 428 and a schematic model diagram of image feature extractor 429 are added in FIG. 8 compared with FIG. 6. Each of the above components may be implemented by means of a neural network model. The present disclosure does not limit the specific implementation of each model, and various known and future-developed neural network models may be used based on the needs of a processing task to be implemented.

An effect diagram of channel converter 428 is illustrated in FIG. 8. As can be seen, channel converter 428 in video reconstructor 420 uses the acquired reference image features $f_R$ to process the foreground video features $f_V$ to convert the foreground video features $f_V$ to the image channel where reference image 770 is located. The operation manner of each of the components in FIG. 8 can be understood with reference to the description above and will not be repeated here for the sake of brevity.

In one embodiment, the video reconstruction method according to the present disclosure may be performed by a video reconstruction model, and as described above, the video reconstruction model may include components such as video feature extractor 422, audio feature extractor 421, and foreground and background information fuser 426. The video reconstruction model may be obtained through training. The way in which the video reconstruction model is trained will be illustrated below in conjunction with FIG. 9.

Figure 9:
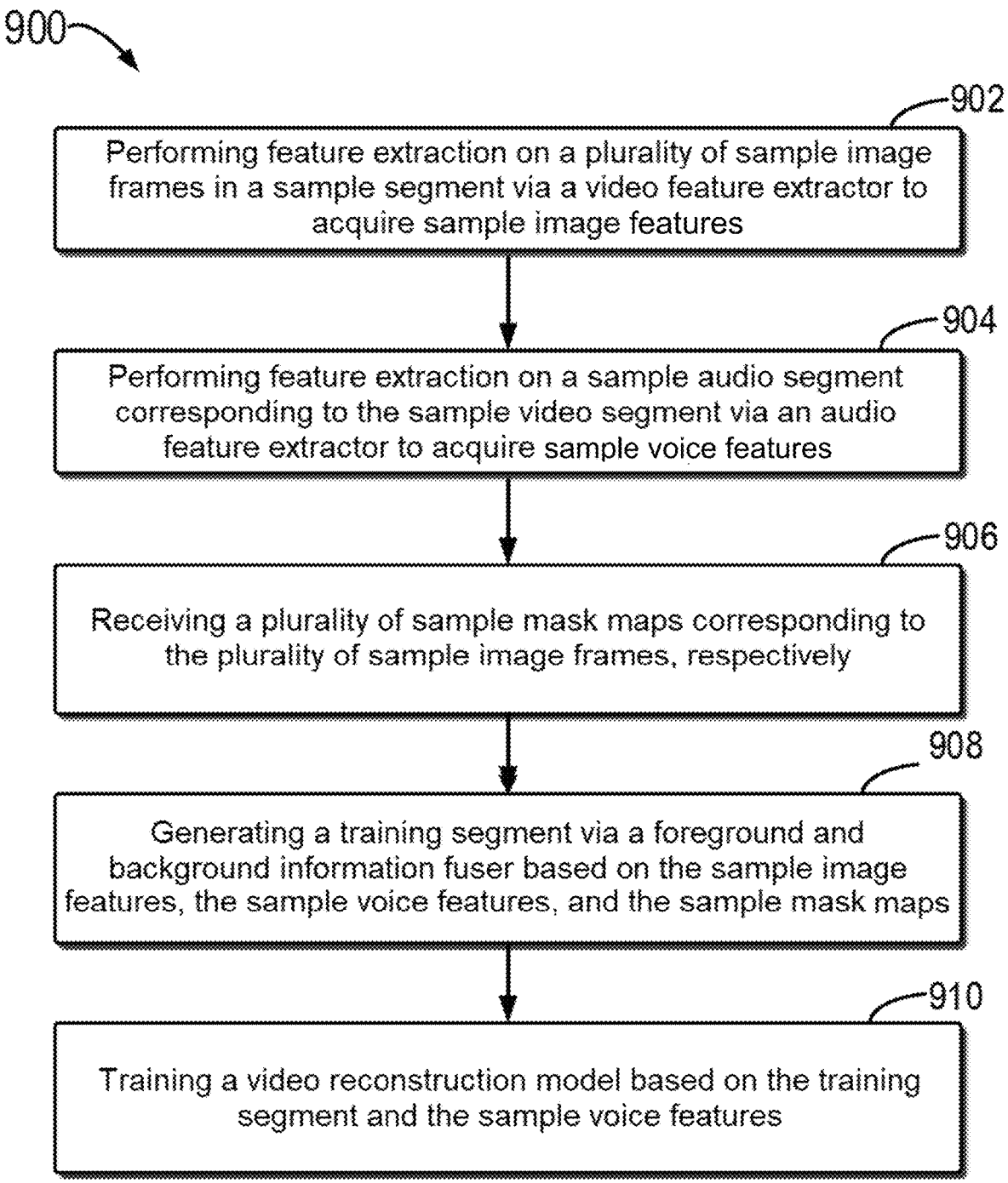
FIG. 9 illustrates a flow chart of a method for training a video reconstruction model according to an embodiment of the present disclosure.

It will be understood that training method 900 in FIG. 9 may be performed in computing device 126 or may also be performed on other computing devices such as a server, which is not limited in the present disclosure.

As shown in FIG. 9, at block 902, feature extraction is performed on a plurality of sample image frames in a sample video segment via the video feature extractor to acquire sample image features. The sample video segment may be obtained after processing an original sample video segment for the training of the video reconstruction model. In one embodiment, the original sample video segment may be processed using a mask map for a target region (e.g., the mouth region) to acquire the sample video segment. For example, the original sample video segment may be processed using the mask map for the mouth region to obtain a mask-processed image frame of the mouth of the target person in the sample video segment.

At block 904, feature extraction is performed on a sample audio segment corresponding to the sample video segment via the audio feature extractor to acquire sample voice features.

At block 906, the video reconstruction model may receive a plurality of sample mask maps corresponding to the plurality of sample image frames, respectively. The present disclosure does not limit the specific manner in which the mask map is acquired.

At block 908, a training video segment is generated via the foreground and background information fuser based on the sample image features, the sample voice features, and the plurality of sample mask maps.

At block 910, the video reconstruction model may be trained based on the training video segment and the sample voice features. For example, parameters in video feature extractor 422, audio feature extractor 421, and foreground and background information fuser 426 may be adjusted to obtain the video reconstruction model.

A specific implementation for training a video reconstruction model (e.g., a video reconstructor) will be described below in conjunction with FIG. 10, in particular for the way of acquiring a loss function when training the video reconstruction model.

Figure 10:
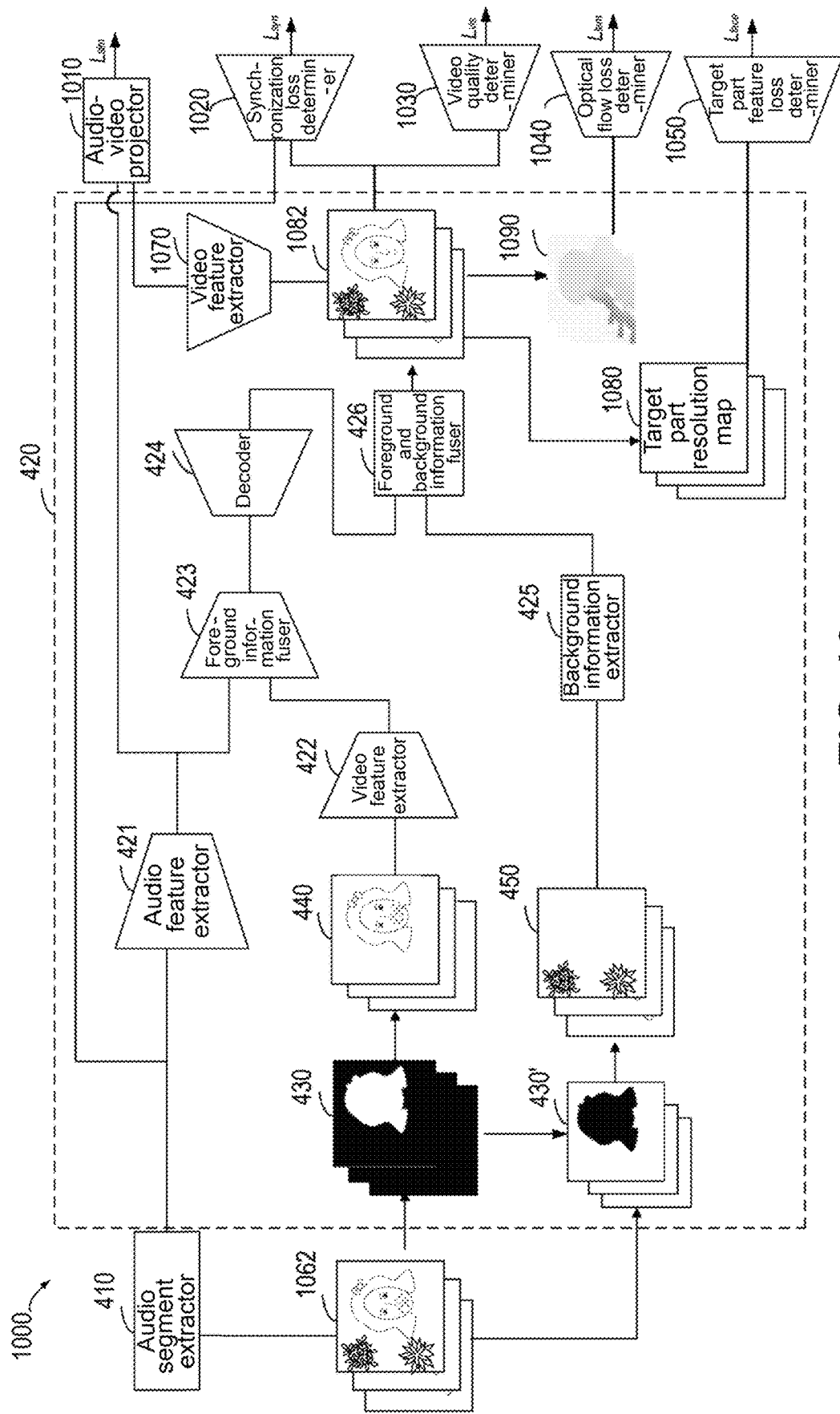
FIG. 10 illustrates a schematic diagram of an architecture for training a video reconstruction model according to an embodiment of the present disclosure.

FIG. 10 is similar to the architecture diagram in FIG. 5, and since it is the architecture employed in the training phase, a loss function determination module is added in FIG. 10 compared with FIG. 5. Specifically, in FIG. 10, during the training of video reconstructor 420, training architecture 1000 may include audio-video projector 1010, synchronization loss determiner 1020, video quality determiner 1030, optical flow loss determiner 1040, and target part feature loss determiner 1050. In FIG. 10, a plurality of sample image frames 1062*i* are received by the video reconstructor for use in training.

Each of the above loss function determiners may be a pre-designed and trained model for determining the loss function for the video reconstruction model to realize adjustment of parameters of the video reconstruction model.

During the training of the video reconstruction model, optical flow loss determiner 1040 may acquire first optical flow information $W_X$ between a plurality of training image frames 1090 in a training video segment. Optical flow loss determiner 1040 may also acquire second optical flow information $W_Y$ between a plurality of original image frames in the original sample video segment that correspond to the plurality of training image frames 1082*i*, and determine the optical flow movement loss $L_{tem}$ based on the first optical flow information $W_X$ and the second optical flow information $W_Y$. For example, optical flow loss determiner 1040 may determine the optical flow movement loss $L_{tem}$ based on Equation 4:

$$L_{tem} = \frac{1}{N}\sum_{i}^{N} \|W_X^i - W_Y^i\|^2 \qquad \text{(Equation 4)}$$

where N is the size of the selected sample batch.

Further, synchronization loss determiner 1020 may determine a synchronization degree loss based on a synchronization degree between a training image segment and a sample audio segment. For example, synchronization loss determiner 1020 may calculate the synchronization degree loss based on Equation 5 below. In one embodiment, synchronization loss determiner 1020 is used to determine whether the training image fragment and the sample audio fragment are fragments corresponding to each other, and synchronization loss determiner 1020 may include a trained classifier. The synchronization degree loss $L_{syn}$ is given by:

$$L_{syn} = \min_{F,G,H,T,P} \max_{D_L} \mathcal{L}(G(\theta, A, V, R, \beta), D_L) \qquad \text{(Equation 5)}$$

where G(θ, A, V, R) indicates the parameters that are adjustable in the audio feature extractor, the video feature extractor, the foreground information fuser, and the foreground and background information fuser.

After obtaining the aforementioned synchronization degree loss $L_{syn}$ and the optical flow movement loss $L_{tem}$, the video reconstruction model may be trained based on a weighted sum of the synchronization degree loss $L_{syn}$ and optical flow movement loss $L_{tem}$.

In one embodiment, other loss functions may also be acquired to train the video reconstruction model. In one embodiment, a loss function characterizing the similarity between sample voice features and image features may be determined. For example, audio-video projector 1010 may calculate the similarity between the sample voice features and the image features and denote the above similarity in the form of a matrix, and each element of the matrix denotes the similarity between the voice feature and image feature in the corresponding row and column. In one embodiment, audio-video projector 1010 may receive sample audio features extracted by audio feature extractor 421 and sample video features extracted by video feature extractor 1070, first project the audio features and the video features into the Euclidean space, and then calculate the similarity between the audio features and the video features using the following Equation 6. Specifically, Equation 6 is as follows:

$$L_{sim} = \sum_{i,j} -\log \frac{\exp(sim(z_A^i, z_X^j)/\tau)}{\sum_{i \neq k} \exp(sim(z_A^i, z_X^k)/\tau)} \quad \text{(Equation 6)}$$

where i, j, and k denote the indexes of the sample batch, respectively, and i is a temperature parameter. The similarity $L_{sim}$ between the audio features and the video features may be acquired by the above Equation 6.

It can be understood that compared with the prediction phase in FIG. 5, video feature extractor 1070 is used in the training architecture in the phase of training the video reconstructor. This video feature extractor 1070 may be the same as or be different from video feature extractor 422, which is not limited in the present disclosure.

In one embodiment, video quality determiner 1030 may calculate the video quality loss $L_{vis}$. For example, $L_{vis}$ may be calculated using the following Equation 7:

$$L_{vis} = \min_{F,G,H,T,P} \max_{D_V} \mathcal{L}(G(\theta, A, V, R), D_V) \quad \text{(Equation 7)}$$

where G(θ, A, V, R) indicates the parameters that are adjustable in the audio feature extractor, the video feature extractor, the foreground information fuser, and the foreground and background information fuser.

In addition, target part feature loss determiner 1050 may determine the target part feature loss. This loss is concerned with the effect of reconstruction of, for example, facial textures, so the target part feature loss may be determined according to the reconstructed training video image features and the original video image frames. For example, the target part feature loss may be determined according to first resolution map 1080 in the plurality of training image frames with respect to the target part and a second resolution map in the plurality of original image frames with respect to the target part. In one embodiment, for an audio-video synchronized video, the mouth in the face may be determined as the target part, and the feature loss for the mouth may be calculated by target part feature loss determiner 1050. In one embodiment, this feature loss may be determined according to Equation 8:

$$L_{face} = \frac{1}{N} \sum_{i}^{N} -y^i \log(S_X^i) \quad \text{(Equation 8)}$$

where $S_X^i$ is the first resolution map in the plurality of training image frames with respect to the target part, and $y^i$ is the second resolution map for the ith sample image.

After the above loss function is calculated, it may be weighted. For example, as shown in Equation 9:

$$L = \lambda_{sim} L_{sim} + \lambda_{syn} L_{syn} + \lambda_{vis} L_{vis} + \lambda_{tem} L_{tem} + \lambda_{face} L_{face} \quad \text{(Equation 9)}$$

By using the loss function L obtained above, the video reconstruction model can be trained. For example, the parameters in the video feature extractor, the audio feature extractor, the foreground information fuser, and the foreground and background information fuser are adjusted to obtain the trained video reconstruction model.

The architecture in FIG. 10 is only an example, and for a video reconstructor that can perform style conversion based on a reference image, a similar training approach and a similar loss function can be adopted so as to train a video reconstructor as shown in FIG. 7. This will not be repeated here for the sake of brevity.

Figure 11:
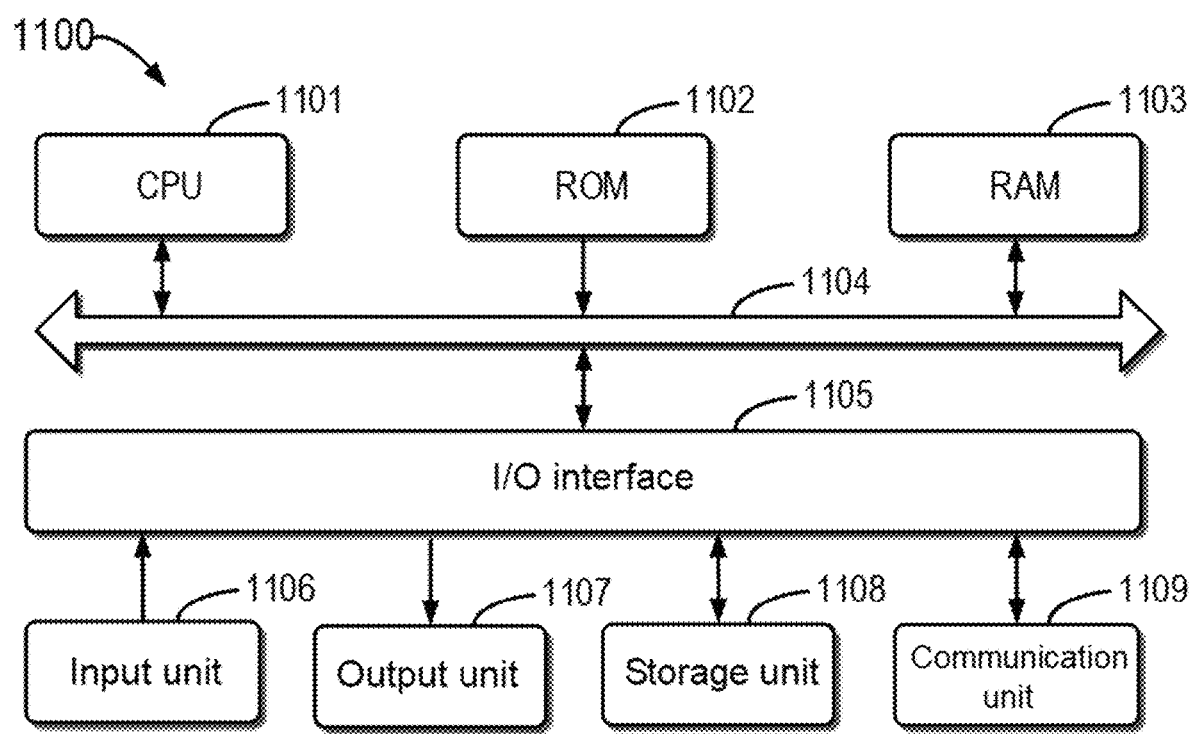
FIG. 11 illustrates an example device suitable for implementing embodiments of the present disclosure according to an embodiment of the present disclosure.

FIG. 11 illustrates a schematic block diagram of example device 1100 that may be used to implement embodiments of the present disclosure. Computing device 126 in FIG. 1 may be implemented using device 1100. As shown in the figure, device 1100 includes central processing unit (CPU) 1101 that can perform various appropriate actions and processing according to computer program instructions stored in read-only memory (ROM) 1102 or loaded from storage unit 1108 into random access memory (RAM) 1103. Various programs and data required for the operation of device 1100 may also be stored in RAM 1103. CPU 1101, ROM 1102, and RAM 1103 are connected to each other through bus 1104. Input/output (I/O) interface 1105 is also connected to bus 1104.

Multiple components in device 1100 are connected to I/O interface 1105, including: input unit 1106, such as a keyboard and a mouse; output unit 1107, such as various types of displays and speakers; storage unit 1108, such as a magnetic disk and an optical disc; and communication unit 1109, such as a network card, a modem, and a wireless communication transceiver. Communication unit 1109 allows device 1100 to exchange information/data with other devices through a computer network such as the Internet and/or various telecommunication networks.

The various processes and processing described above, for example, method 200, method 300 and/or method 900, may be performed by CPU 1101. For example, in some embodiments, method 200, method 300 and/or method 900, etc. may be implemented as a computer software program that is tangibly contained in a machine-readable medium, such as storage unit 1108. In some embodiments, part or all of the computer program may be loaded and/or mounted to device 1100 via ROM 1102 and/or communication unit 1109. When the computer program is loaded into RAM 1103 and executed by CPU 1101, one or more actions of method 200, method 300 and/or method 900, etc. described above may be performed.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Various illustrative embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method comprising:
receiving a video segment comprising a plurality of image frames;
determining an audio segment corresponding to the video segment;
acquiring a plurality of mask maps corresponding to the plurality of image frames, respectively; and
reconstructing the video segment based on the audio segment, the plurality of image frames, and the plurality of mask maps;
wherein reconstructing the video segment comprises:
acquiring foreground fusion information based on the audio segment, the plurality of image frames in the video segment, and the plurality of mask maps;
acquiring background information based on the plurality of image frames in the video segment and the plurality of mask maps; and
performing fusion processing on the foreground fusion information and the background information to reconstruct the video segment;
wherein performing fusion processing on the foreground fusion information and the background information to reconstruct the video segment comprises:
performing convolution processing on the plurality of mask maps and acquiring corresponding mask features;
determining complementary mask features corresponding to the mask features; and
reconstructing the video segment based on the complementary mask features and the foreground fusion information as well as the mask features and the background information; and
wherein the foreground fusion information comprises foreground features, the background information comprises background features, and wherein reconstructing the video segment comprises:
processing the foreground features using the complementary mask features to acquire processed foreground features;
processing the background features using the mask features to acquire processed background features; and
performing superimposing processing on the processed foreground features and the processed background features to reconstruct the video segment.

2. The method according to claim 1, wherein a plurality of image frames in the reconstructed video segment are synchronized with frames of the audio segment.

3. The method according to claim 1, wherein acquiring a plurality of mask maps corresponding to the plurality of image frames, respectively, comprises:
performing target detection on the plurality of image frames;
setting a pixel value of a target region detected from the plurality of image frames to a first pixel value; and
setting pixel values of regions in the plurality of image frames other than the target region to a second pixel value.

4. The method according to claim 1, wherein acquiring foreground fusion information comprises:
extracting audio features of the audio segment;
processing the plurality of image frames in the video segment using the plurality of mask maps, respectively, to acquire a plurality of mask-processed foreground image frames;
extracting image features in the plurality of mask-processed foreground image frames to obtain foreground video features; and
acquiring the foreground fusion information according to the audio features and the foreground video features.

5. The method according to claim 4, wherein acquiring the foreground fusion information according to the audio features and the foreground video features comprises:
performing normalization processing on the audio features and the foreground video features, respectively; and
concatenating the normalized audio features with the normalized foreground video features to acquire the foreground fusion information.

6. The method according to claim 4, further comprising:
receiving at least one reference image;
extracting reference image features in the at least one reference image,
wherein acquiring the foreground fusion information according to the audio features and the foreground video features comprises:
processing the foreground video features using the reference image features to convert the foreground video features to an image channel where the reference image is located; and
concatenating the channel-converted foreground video features with the audio features to acquire channel-converted foreground fusion information.

7. The method according to claim 6, wherein reconstructing the video segment comprises:
performing convolution processing on the plurality of mask maps and acquiring corresponding mask features;
determining complementary mask features corresponding to the mask features;
reconstructing the video segment based on the complementary mask features and the channel-converted foreground fusion information as well as the acquired corresponding mask features and the background information.

8. The method according to claim 1, wherein acquiring background information comprises:
acquiring a plurality of complementary mask maps corresponding to the plurality of mask maps, respectively;
processing the plurality of image frames in the video segment using the plurality of complementary mask maps, respectively, to acquire a plurality of complementary mask-processed background image frames; and
extracting image features in the plurality of complementary mask-processed background image frames as the background information.

9. The method according to claim 1, the method being performed by a video reconstruction model that comprises a video feature extractor, an audio feature extractor, and a foreground and background information fuser, wherein the video reconstruction model is obtained through training in the following manner:
performing feature extraction on a plurality of sample image frames in a sample video segment via the video feature extractor to acquire sample image features;

performing feature extraction on a sample audio segment corresponding to the sample video segment via the audio feature extractor to acquire sample voice features;

receiving a plurality of sample mask maps corresponding to the plurality of sample image frames, respectively;

generating a training video segment via the foreground and background information fuser based on the sample image features, the sample voice features, and the plurality of sample mask maps; and training the video reconstruction model based on the training video segment and the sample voice features.

10. The method according to claim 9, wherein training the video reconstruction model comprises:

adjusting parameters in the video feature extractor, the audio feature extractor, and the foreground and background information fuser to obtain the video reconstruction model.

11. The method according to claim 9, wherein the sample video segment is acquired in the following manner:

processing an original sample video segment using a mask map for a target region to acquire the sample video segment.

12. The method according to claim 11, wherein training the video reconstruction model comprises:

acquiring first optical flow information between a plurality of training image frames in the training video segment;

acquiring second optical flow information between a plurality of original image frames in the original sample video segment that correspond to the plurality of training image frames;

determining an optical flow movement loss based on the first optical flow information and the second optical flow information;

determining a synchronization degree loss based on a synchronization degree between the sample audio segment and the training video segment; and training the video reconstruction model according to a weighted sum of the optical flow movement loss and the synchronization degree loss.

13. The method according to claim 12, wherein training the video reconstruction model further comprises:

determining a similarity loss between the sample voice features and training image features;

determining a video quality loss according to the training video segment and the original sample video segment; and determining a target part feature loss according to a first resolution map in the plurality of training image frames with respect to a target part and a second resolution map in the plurality of original image frames with respect to the target part.

14. The method according to claim 13, wherein training the video reconstruction model further comprises:

adjusting parameters in the video feature extractor, the audio feature extractor, and the foreground and background information fuser according to a weighted sum of the optical flow movement loss, the synchronization degree loss, the similarity loss, the video quality loss, and the target part feature loss, so as to obtain the trained video reconstruction model.

15. An electronic device, comprising:

at least one processor; and at least one memory coupled to the at least one processor and storing instructions for execution by the at least one processor, wherein the instructions, when executed by the at least one processor, cause the electronic device to execute actions, the actions comprising:

receiving a video segment comprising a plurality of image frames;

determining an audio segment corresponding to the video segment;

acquiring a plurality of mask maps corresponding to the plurality of image frames, respectively; and reconstructing the video segment based on the audio segment, the plurality of image frames, and the plurality of mask maps;

wherein reconstructing the video segment comprises:

acquiring foreground fusion information based on the audio segment, the plurality of image frames in the video segment, and the plurality of mask maps;

acquiring background information based on the plurality of image frames in the video segment and the plurality of mask maps; and performing fusion processing on the foreground fusion information and the background information to reconstruct the video segment;

wherein performing fusion processing on the foreground fusion information and the background information to reconstruct the video segment comprises:

performing convolution processing on the plurality of mask maps and acquiring corresponding mask features;

determining complementary mask features corresponding to the mask features; and reconstructing the video segment based on the complementary mask features and the foreground fusion information as well as the mask features and the background information; and wherein the foreground fusion information comprises foreground features, the background information comprises background features, and wherein reconstructing the video segment comprises:

processing the foreground features using the complementary mask features to acquire processed foreground features;

processing the background features using the mask features to acquire processed background features; and performing superimposing processing on the processed foreground features and the processed background features to reconstruct the video segment.

16. The electronic device according to claim 15, wherein acquiring foreground fusion information comprises:

extracting audio features of the audio segment;

processing the plurality of image frames in the video segment using the plurality of mask maps, respectively, to acquire a plurality of mask-processed foreground image frames;

extracting image features in the plurality of mask-processed foreground image frames to obtain foreground video features; and acquiring the foreground fusion information according to the audio features and the foreground video features; and wherein the actions further comprise:

receiving at least one reference image;

extracting reference image features in the at least one reference image, wherein acquiring the foreground fusion information according to the audio features and the foreground video features comprises:

processing the foreground video features using the reference image features to convert the foreground video features to an image channel where the reference image is located; and concatenating the channel-converted foreground video features with the audio features to acquire channel-converted foreground fusion information.

17. The electronic device according to claim 15, wherein one or more of the actions are performed by a video reconstruction model that comprises a video feature extractor, an audio feature extractor, and a foreground and background information fuser, wherein the video reconstruction model is obtained through training in the following manner:

performing feature extraction on a plurality of sample image frames in a sample video segment via the video feature extractor to acquire sample image features;

performing feature extraction on a sample audio segment corresponding to the sample video segment via the audio feature extractor to acquire sample voice features;

receiving a plurality of sample mask maps corresponding to the plurality of sample image frames, respectively;

generating a training video segment via the foreground and background information fuser based on the sample image features, the sample voice features, and the plurality of sample mask maps; and training the video reconstruction model based on the training video segment and the sample voice features.

18. A computer program product tangibly stored on a non-transitory computer-readable medium and comprising machine-executable instructions, wherein the machine-executable instructions, when executed by a machine, cause the machine to perform actions comprising:

receiving a video segment comprising a plurality of image frames;

determining an audio segment corresponding to the video segment;

acquiring a plurality of mask maps corresponding to the plurality of image frames, respectively; and reconstructing the video segment based on the audio segment, the plurality of image frames, and the plurality of mask maps;

wherein reconstructing the video segment comprises:

acquiring foreground fusion information based on the audio segment, the plurality of image frames in the video segment, and the plurality of mask maps;

acquiring background information based on the plurality of image frames in the video segment and the plurality of mask maps; and performing fusion processing on the foreground fusion information and the background information to reconstruct the video segment;

wherein performing fusion processing on the foreground fusion information and the background information to reconstruct the video segment comprises:

performing convolution processing on the plurality of mask maps and acquiring corresponding mask features;

determining complementary mask features corresponding to the mask features; and reconstructing the video segment based on the complementary mask features and the foreground fusion information as well as the mask features and the background information; and wherein the foreground fusion information comprises foreground features, the background information comprises background features, and wherein reconstructing the video segment comprises:

processing the foreground features using the complementary mask features to acquire processed foreground features;

processing the background features using the mask features to acquire processed background features; and performing superimposing processing on the processed foreground features and the processed background features to reconstruct the video segment.

19. The computer program product according to claim 18, wherein acquiring a plurality of mask maps corresponding to the plurality of image frames, respectively, comprises:

performing target detection on the plurality of image frames;

setting a pixel value of a target region detected from the plurality of image frames to a first pixel value; and setting pixel values of regions in the plurality of image frames other than the target region to a second pixel value.

20. The computer program product according to claim 18, wherein acquiring foreground fusion information comprises:

extracting audio features of the audio segment;

processing the plurality of image frames in the video segment using the plurality of mask maps, respectively, to acquire a plurality of mask-processed foreground image frames;

extracting image features in the plurality of mask-processed foreground image frames to obtain foreground video features; and acquiring the foreground fusion information according to the audio features and the foreground video features; and wherein the actions further comprise:

receiving at least one reference image;

extracting reference image features in the at least one reference image, wherein acquiring the foreground fusion information according to the audio features and the foreground video features comprises:

processing the foreground video features using the reference image features to convert the foreground video features to an image channel where the reference image is located; and concatenating the channel-converted foreground video features with the audio features to acquire channel-converted foreground fusion information.

* * * * *